Dec. 15, 1936.   C. H. HAPGOOD   2,064,306
MILK DELIVERY REGISTERING MEANS
Filed March 16, 1933   2 Sheets-Sheet 1
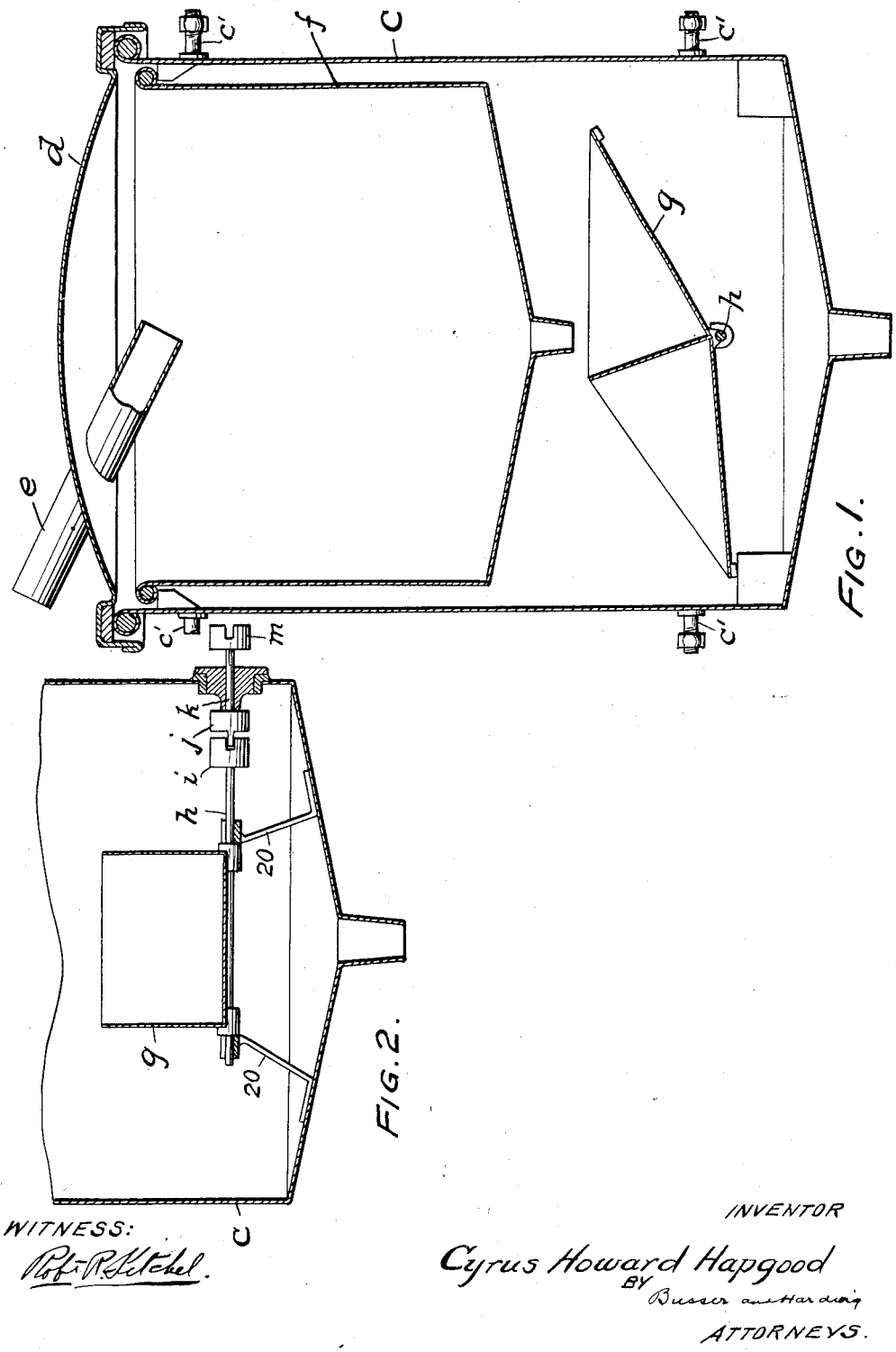
WITNESS:
Rob'r P. Kitchel
INVENTOR
Cyrus Howard Hapgood
BY
Busser and Harding
ATTORNEYS.

Dec. 15, 1936. C. H. HAPGOOD 2,064,306
MILK DELIVERY REGISTERING MEANS
Filed March 16, 1933 2 Sheets-Sheet 2
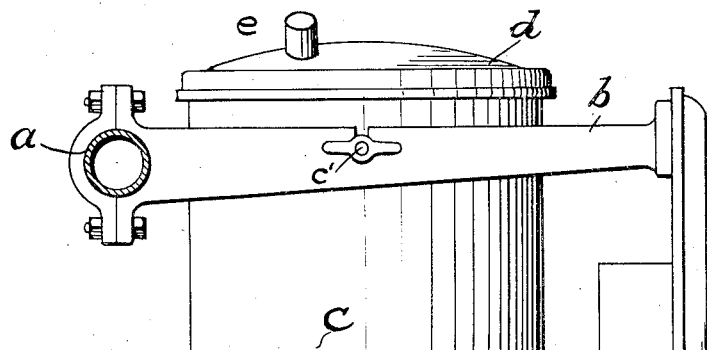
FIG 3.
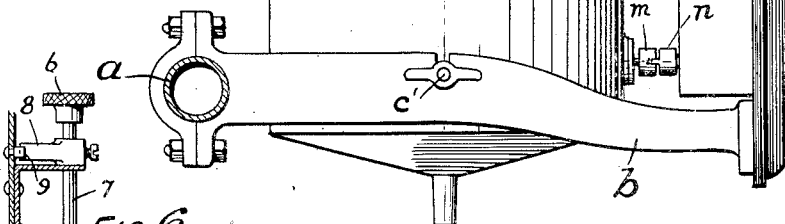
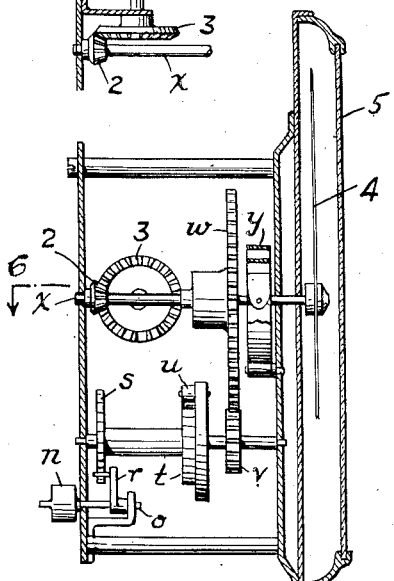
FIG. 4.
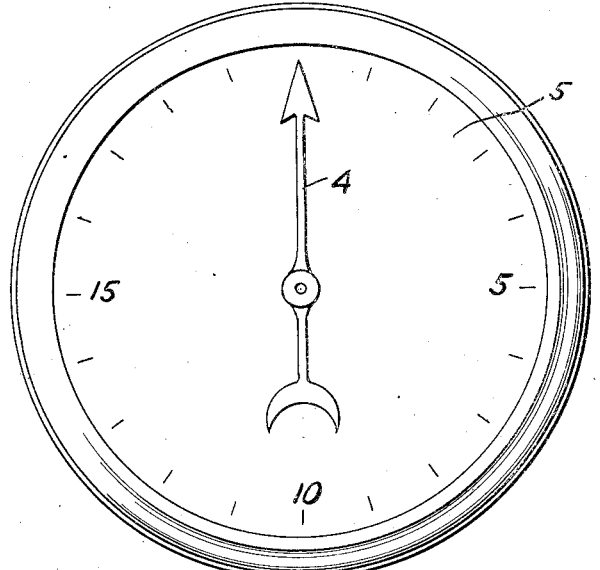
FIG. 5.
WITNESS:
Rob R Stobel
INVENTOR
Cyrus Howard Hapgood
BY
Busser and Harding
ATTORNEYS.

Patented Dec. 15, 1936

2,064,306

UNITED STATES PATENT OFFICE 2,064,306

MILK DELIVERY REGISTERING MEANS

Cyrus Howard Hapgood, Nutley, N. J., assignor to The De Laval Separator Company, New York, N. Y., a corporation of New Jersey Application March 16, 1933, Serial No. 661,075

2 Claims. (Cl. 249—35)

The object of the invention is to provide a flow meter comprising mechanism for registering the weight or volume of milk delivered by milking machines and particularly to register the weight of milk delivered by single cows.

In the drawings:

Fig. 1 is a vertical sectional view of a device for receiving milk to be weighed and for discharging same, and of parts of the flow meter associated therewith.

Fig. 2 is a similar view, taken at right angles to Fig. 1, of the lower part of the construction shown in Fig. 1 and showing also the connection of the tiltable milk receiver with a shaft from which the operation of the registering mechanism is controlled.

Fig. 3 is a side elevation of the complete apparatus.

Fig. 4 is an elevational view of the mechanism for mechanically actuating the indicator.

Fig. 5 is a face view of the indicator.

Fig. 6 is a partial section on line 6 of Fig. 4.

Secured to two rails $a$, $a$ are four arms $b$, $b$ (two are shown) provided with notches adapted to receive pintles $c'$ projecting from the wall of the body of the main container $c$. Secured to the container body $c$ is a top $d$ through which extends, preferably tangentially, a milk delivery pipe or tube $e$. Suspended within the body $c$ is a vessel $f$ into which the milk is initially delivered. Vessel $f$ is provided with a restricted opening in its bottom adapted to discharge the milk, with a fairly uniform flow, into one of two compartments of a milk receiver $g$ secured to a freely oscillatable shaft $h$. The receiver $g$ is so balanced and positioned that when a given weight of milk is deposited in the compartment positioned to receive it, the receiver swings into its opposite position, discharging the milk into the bottom of the container $c$, from which the milk discharges through an opening in its bottom to an ultimate receiver. The described swinging movement of the receiver $g$ positions its other compartment to receive milk, and when a given weight of milk accumulates in the last named compartment, the receiver swings in the opposite direction and again discharges its content of milk. Tiltable milk receivers operating on this principle and adapted to actuate indicating mechanism are known in the art.

The shaft $h$ of the milk receiver $g$ has secured to it a coupling member $i$ engaging a coupling member $j$ secured to a shaft $k$. Shaft $k$ has secured to it a coupling member $m$ engaging a coupling member $n$ secured to a shaft $o$.

Referring to Fig. 4: Shaft $o$ operates an escapement comprising a forked lever $r$ in operative engagement with a toothed wheel $s$, which is adapted to be turned always a given distance in in one direction whether the shaft $o$ is turned in one direction or the other. The shaft of wheel $s$ carries a ratchet wheel $t$, which is engaged by a pawl $u$ on a shaft carrying a pinion $v$. This pinion engages a gear wheel $w$ on a shaft $x$, which is actuated by a coil spring $y$ tending to turn the shaft $x$ continuously in one direction. It is prevented from so continuously turning by the normal engagement of the escapement lever $r$ with the toothed wheel $s$, which holds the ratchet wheel $t$ stationary and holds the pawl $u$ from advancing. When, however, the toothed wheel $s$ is turned as described the ratchet wheel $t$ turns a definite distance and allows the pawl to advance a corresponding distance, thereby allowing the spring $y$ to turn the shaft $x$ a given distance. To shaft $x$ is secured an indicator lever 4 (see also Fig. 5) associated with a dial scale 5, which may be a glass plate provided with graduations.

From the foregoing description it will be understood that after each oscillatory movement of the milk receiver $g$ the indicating lever 4 moves a definite distance around the dial scale and thereby indicates the total weight of milk that up to that time has been discharged from the container.

On shaft $x$ is a bevel gear 2 engaging a bevel gear 3 the shaft of which carries a knob 6 for winding up the spring. After the conclusion of the milking operation the indicator is set to zero by turning the shaft of bevel wheel 3 to wind up the spring $y$, the pawl $u$ moving over the ratchet wheel $t$ in the direction in which it is not locked from movement.

It is desirable to provide means whereby, if the milking operation continue long enough, the movement of the indicator arm 4 will be arrested before the spring is unwound. To this end there is provided, on the shaft 7 of bevel gear 3, a stop lever 8, which is adapted to engage a stop 9. If a single stop is provided, it should be so located as to allow the indicator arm 4 to make several nearly complete revolutions, for example, to make nearly three complete revolutions, thus indicating weight, on the particular scale shown, to nearly 60 pounds, the stop being so positioned that, after the spring is re-wound, the indicator arm 4, in its reverse movement, when it again contacts with the stop, will register precisely zero.

By the use of the registering device described, or equivalents thereof, the operator may, at a glance, ascertain the total quantity of milk that at any given time has been discharged from the container, and the registering device can be reset at the conclusion of the milking operation and preparatory to the next milking operation.

The shaft $h$ is shown as turning in bearings supported on brackets 20 mounted on the bottom of the container. In order to illustrate the coupling $i, j$, it is shown 90° from the positions which the engaging projection and notch thereof preferably occupy. In the preferred position, the direction of lateral extension of the projection and notch is vertical so as to allow the container $c$ to be lifted off its supporting arms preparatory to cleaning and so as to permit the ready engagement of the coupling members when the container is replaced. Instead of so arranging the coupling the coupling member $m$ may be splined on the shaft $k$, so that it may be moved laterally and the coupling member $m$ thereby be withdrawn from engagement with the coupling member $n$ preparatory to the removal of the container.

Receivers, such as the receiver $g$, connected with indicating mechanism are known; but the operation has been inaccurate. This inaccuracy has been due to the fact that the receiver, in its movement, positively moved the indicating mechanism. To the load thus imposed on the receiver, which is of necessity variable, is attributable the inaccuracy mentioned. In my improvement, no load is imposed on the receiver $g$, as no power is required to make the electrical contacts or to release a clock escapement.

The provision of a vessel ($f$) with a restricted outlet to provide a fairly uniform flow of milk into receiver $g$, and the method, which the construction renders possible, of separating the air from the milk, necessary for weighing, and then taking both weighed milk and air out of the bottom of vessel $c$, constitute other advantages of the construction shown in Fig. 1.

What I claim and desire to protect by Letters Patent is:

1. In a milk flow meter, the combination with a container, of supporting means for the container from which the container may be disengaged by lifting, a plural compartment milk receiver within the container adapted to swing to discharge milk from one compartment and position the other compartment to receive milk, a shaft turnable with the receiver, a second shaft, engaging coupling members on said shafts, an indicating device, and power means controllable from the second shaft to actuate the indicating device, said second shaft, indicating device, and power means being mounted upon the supporting means, and said coupling members being disengageable to allow the container to be lifted from its supporting means and thereby be disengaged from said power means and indicating device.

2. In a milk flow meter, the combination with a container, of supporting means for the container from which the container may be disengaged by lifting, a plural compartment milk receiver within the container adapted to swing to discharge milk from one compartment and position the other compartment to receive milk, a shaft turnable with the receiver, means within the container supporting said shaft and from which said shaft and receiver are disengageable by lifting, a second shaft carried by the container, a third shaft, an indicating device, power-operated means controllable from the third shaft to actuate the indicating device, coupling members on the first and second shafts, said coupling members being disengageable to allow the receiver to be lifted from and readily replaced upon its supporting means, and coupling members between the second and third shaft, the last named coupling members being also disengageable to allow the container to be lifted from its supporting means and thereby be disengaged from said power means and indicating device.

CYRUS HOWARD HAPGOOD.